United States Patent Office 3,824,307
Patented July 16, 1974

3,824,307
METHOD OF CONTROLLING BACTERIA, YEAST AND FUNGAL SPECIES WITH PHENYLBISMUTH BIS(2-PYRIDINETHIOL-1-OXIDE)
John Downing Curry, Oxford, Ohio, assignor to The Procter & Gamble Company, Cincinnati, Ohio
No Drawing. Application Jan. 17, 1972, Ser. No. 218,584, now Patent No. 3,753,990, which is a continuation-in-part of abandoned application Ser. No. 98,086, Dec. 14, 1970. Divided and this application Mar. 30, 1973, Ser. No. 346,395
Claims priority, application Netherlands, Apr. 4, 1972, 7204437; France, Apr. 7, 1972, 7212388; Germany, Apr. 7, 1972, P 22 16 725; Sweden, Apr. 10, 1972, 4,611/72
Int. Cl. A61k 27/00; A61l 13/00; A01n 9/22
U.S. Cl. 424—245                                              3 Claims

ABSTRACT OF THE DISCLOSURE

A method of controlling a broad spectrum of bacteria, yeast and fungal species by contacting said species with an effective amount of phenylbismuth bis(2-pyridinethiol 1-oxide).

CROSS-REFERENCE TO RELATED APPLICATIONS

This is a divisional application of my copending application Ser. No. 218,584, filed Jan. 17, 1972, for "Phenylbismuth bis (2-pyridinethiol 1-oxide and compositions containing same," now U.S. Pat. 3,753,990, issued Aug. 21, 1973 which in turn is a continuation-in-part of my application Ser. No. 98,086, filed Dec. 14, 1970, for "Phenylbismuth Di (pyridinethione-N-oxide) and compositions containing same," now abandoned.

BACKGROUND OF THE INVENTION

Field of the Invention

The present invention relates to a new compound, phenylbismuth bis (2-pyridinethiol 1-oxide), which can be formed by the reaction between sodium 2-pyridinethiol 1-oxide and diphenylbismuth acetate. This invention also relates to the use of this compound, which is highly effective against a broad spectrum of bacteria as well as yeast and fungal species, especially when used on the skin, where the compound is fairly substantive, and to compositions, including detergent compositions, containing said compound.

PRIOR ART

Leebrick's U.S. Pat. 3,239,411, issued Mar. 8, 1966; Gross' U.S. Pat. 3,197,314 issued July 27, 1965; Leebrick's French Pat. 1,426,118; and American Cyanamid's British Patent 1,003,695 teach that various organo-bismuth compounds, including diphenylbismuth acetate, are effective antibacterial and antifungal agents for use against a wide variety of gram-positive and gram-negative organisms. Similarly, the sodium salt of 2-pyridinethiol 1-oxide is known. See, e.g., British Pat. 761,171, and U.S. Pats. 2,742,393, and 2,742,476. Schroder et al.'s U.S. Pat. 3,321,480 teaches triphenyl tin (2-pyridinethione) [triphenyl tin (2-pyridinethiol 1-oxide)].

SUMMARY OF THE INVENTION

Phenylbismuth bis(2-pyridinethiol 1-oxide) has the formula:

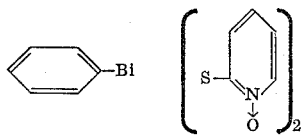

Compositions containing phenylbismuth bis(2-pyridinethiol 1-oxide) have excellent broad-spectrum antibacterial and antifungal action.

Phenylbismuth bis(2-pyridinethiol 1-oxide), hereinafter referred to as PBDP, is a yellow powder having a melting point at about 215–218°. It is generally insoluble in most common solvents, but is soluble to the extent of about 1% in dimethylsulfoxide, dimethylformamide or dimethylacetamide. The dry solid PBDP is stable and the PBDP appears stable in the presence of soap solutions (pH 9–10) and hydrochloric acid (pH 1).

Phenylbismuth bis(2-pyridinethiol 1-oxide) has been shown to exhibit antibacterial and antifungal effectiveness against, e.g., Gram-positive organisms such as: *Brevibacterium ammoniagenes, Erysipelothrix insidiosa, Lactobacillus leichmanni, Bacillus subtilus, Clostridium perfringens, Staphylococcus aureus, Staphylococcus epidermidis, Sarcina lutea, Streptococcus faecalis, Corynebacterium acnes,* Axilla diphtheroid #16, Oral Streptococcus #126, *Mycobacterium phlei, Mycobacterium smegmatis,* and *Mycobacterium balnei;* Gram-negative organisms such as: *Alkaligenes faecalis, Salmonella typhosa, Shigella flexneri, Mima polymorpha, Herellea vaginicola, Hemophilus gallinarum, Proteus mirabilis, Vibrio metschnikovii, Neisseria flavescens, Escherichia coli, Pseudomonas aeruginosa, Serratia marcescens, Klebsiella pneumoniae,* and *Enterobacter aerogenes;* and Fungi (including yeasts and dermatophytes) such as: *Aspergillus niger, Mycrosporum gypseum, Trichophyton rubrum, Trichophyton interdigitale, Saccharomyces cerevisiae, Candida albicans,* and *Pityrosporum ovale.*

Because of the extremely broad antibacterial and antifungal effectiveness of PBDP it is desirably used as a component of surgical scrub products, bar soaps, shampoos, oral products (e.g., toothpastes, mouthwashes, etc.), first aid sprays, foot powder, deodorants (especially underarm deodorants), first aid creams, toilet bowl cleaners, hard surface cleaners, detergents, paints, cosmetics, spermicides, burn dressings, animal feeds, wood preservatives, mildewcides, germicides, algacides, fungicides, medicines, packing preservatives, etc. In extremely small amounts, e.g., 10 p.p.m., the PBDP will inhibit the growth of a broad variety of organisms. When the PBDP is incorporated in larger amounts, the compositions can be used to destroy organisms, as required. For example, in medicine, both for humans and veterinary medicine, the PBDP can be used to treat a variety of diseases and/or organisms including acne, leprosy, psoriasis, warts, intestinal parasites, dandruff, pseudomonas or coli bacteria, fungus (e.g., athlete's foot), vaginal infections, etc. Compositions containing PBDP can be used to treat tissue either to prevent infections or to cure infections.

PBDP is not inactivated by urine or hair oil, but its activity is somewhat diminished by human serum or human red blood cell lysate. Its activity is somewhat greater in acid to neutral media against *S. aureus* and *E. coli*. PBDP is substantive to tooth enamel and cellulose. Thus, PBDP can be used to prevent the growth of plaque in the mouth and can be used against gingivitis. Also, it can be used on bandages, diapers, and sanitary napkins to prevent infections, diaper rash, odor, etc. PBDP can also be used as a slimicide and preservative for paper and wood.

Preparation of Phenylbismuth bis(2-pyridinethiol 1-oxide)

Phenylbismuth bis(2-pyridinethiol 1-oxide) can be prepared by reacting diphenylbismuth acetate with sodium 2-pyridinethiol 1-oxide in a 1:1 molar ratio in a solvent such as dimethyl formamide. The compound, a yellow precipitate, can then be filtered and purified as exemplified hereinafter in Example I. Other reactions to form phenylbismuth bis(2-pyridinethiol 1-oxide) include the reaction of sodium, potassium, ammonium, or lithium 2- pyridinethiol 1-oxide or any other salt containing a loosely held cation with a phenylbismuth dihalide (e.g., a chloride, bromide, or iodide).

Compositions Containing Phenylbismuth bis(2-pyridinethiol 1-oxide)

Phenylbismuth bis(2-pyridinethiol 1-oxide) can be used in aqueous and/or non-aqueous solvents to provide antibacterial action. Preferably, the compositions will contain from about .2% to about 3% phenylbismuth bis(2-pyridinethiol 1-oxide), most preferably from about 1% to about 2%. Desirable compositions are those containing soap and non-soap synthetic detergent compounds. Preferably, the synthetic detergent compounds are cationic, amphoteric, or nonionic.

The term "soap" as used herein is meant to designate alkali metal soaps such as the sodium and potassium salts of the higher fatty acids of naturally occurring plant or animal esters, e.g., palm oil, coconut oil, babassu oil soybean oil, castor oil, tallow, whale and fish oils, grease and lard and mixtures thereof. Sodium and potassium soaps can be made by direct saponification of the fats and oils or by the neutralization of the fatty acids which are prepared in a separate manufacturing process. Examples of suitable soaps are the sodium, potassium, ammonium and alkylolammonium salts of higher fatty acids ($C_{10}$–$C_{20}$). Particularly useful are the sodium and potassium salts of the mixtures of fatty acids derived from coconut oil and tallow, i.e., sodium or potassium tallow and coconut soap.

Anionic synthetic detergents which can be used with the antibacterial, antifungal, and antiyeast compound of the present invention can be broadly defined as the water-soluble salts, including the alkali metal, ammonium and substituted ammonium salts, of organic sulfuric reaction products having in their molecular structure an alkyl radical containing from about 8 to about 22 carbon atoms and a radical selected from the group consisting of sulfonic acid and sulfuric acid ester radicals.

Important examples of the synthetic detergents which can be used with the compound of the present invention are the following: alkali metal (e.g., sodium and potassium), ammonium and substituted ammonium (e.g., lower alkali ammonium) salts of the following: alkyl sulfates, especially those obtained by sulfating the higher alcohols produced by reducing the glycerides of tallow or coconut oil; random paraffin sulfonates, in which the alkyl group contains from about 8 to about 22 carbon atoms, prepared by treating random paraffin hydrocarbons in sulfur dioxide and chlorine in the presence of light followed by treating with a base; branched or linear alkyl benzene sulfonates, in which the alkyl group contains from about 8 to about 18 carbon atoms, preferably from about 10 to about 14 carbon atoms, especially those of the types described in U.S. Pat. Nos. 2,220,099, and 2,477,383; sodium alkyl glyceryl ether sulfonates, especially those ethers of the higher alcohols derived from tallow and coconut oil; coconut oil fatty acid monoglyceride sulfates and sulfonates; sulfuric acid esters of the reaction product of one mole of a higher fatty alcohol (e.g., tallow or coconut alcohols) and from about 1 to about 6, preferably about 3 moles of ethylene oxide; alkyl phenol ethylene oxide ether sulfates with about 4 units of ethylene oxide per molecule and in which the alkyl radicals contain about 9 carbon atoms; the reaction product of fatty acids esterified with isethionic acid and neutralized with sodium hydroxide where, for example, the fatty acids are derived from coconut oil; fatty acid amides of the methyl taurine in which the fatty acids, for example, are derived from coconut oil; sulfonated olefins of U.S. Pat. No. 3,332,880; and others known in the art, a number being specifically set forth in U.S. Pat. Nos. 2,486,921, 2,486,922 and 2,396,278.

The nonionic synthetic detergents which can be used with the antibacterial compound of the present invention may be broadly defined as compounds produced by the condensation of alkylene oxide groups (hydrophilic in nature) with an organic hydrophobic compound which may be aliphatic or alkyl-aromatic in nature. The length of the hydrophilic or polyoxyalkylene radical which is condensed with any particular hydrophobic group can be readily adjusted to yield a water-soluble compound having the desired degree of balance between hydrophilic and hydrophobic elements.

For example, a well-known class of nonionic synthetic detergents is made available on the market under the trade name of "Pluronic." These compounds are formed by condensing ethylene oxide with a hydrophobic base formed by the condensation of propylene oxide with propylene glycol. The hydrophobic portion of the molecule which, of course, exhibits water insolubility has a molecular weight of from about 1,500 to about 1,800. The addition of polyoxyethylene radicals to this hydrophobic portion tends to increase the water solubility of the molecule as a whole and the liquid character of the products is retained up to the point where polyoxyethylene content is about 50% of the total weight of the condensation product.

Other suitable nonionic synthetic detergents include:

1. The polyethylene oxide condensates of alkyl phenols, e.g., the condensation products of alkyl phenols having an alkyl group containing from about 6 to 12 carbon atoms in either a straight chain or branched chain configuration, with ethylene oxide, the said ethylene oxide being present in amounts equal to 10 to 60 moles of ethylene oxide per mole of alkyl phenol. The alkyl substituent in such compounds may be derived from polymerized propylene, diisobutylene, octane, or nonane, for example.

2. Those derived from the condensation of ethylene oxide with the product resulting from the reaction of propylene oxide and ethylene diamine—products which may be varied in composition depending upon the balance between the hydrophobic and hydrophilic elements which is desired. For example, compounds containing from about 40% to about 80% polyoxyethylene by weight and having a molecular weight of from about 5,000 to about 11,000 resulting from the reaction of ethylene oxide groups with a hydrophobic base constituted of the reaction product of ethylene diamine and excess propylene oxide, said base having a molecular weight of the order of 2,500 to 3,000, are satisfactory.

3. The condensation product of aliphatic alcohols having from 8 to 18 carbon atoms, in either straight chain or branched chain configuration, with ethylene oxide, e.g., a coconut alcohol ethylene oxide condensate having from 10 to 30 moles of ethylene oxide per mole of coconut alchol, the coconut alchol fraction having from 10 to 14 carbon atoms.

4. Long chain tertiary amine oxides corresponding to the following general formula, $R_1R_2R_3N \rightarrow O$, wherein $R_1$ contains an alkyl, alkenyl or monohydroxy alkyl radical of from about 8 to about 18 carbon atoms, from 0 to about 10 ethylene oxide moieties, and from 0 to 1 glyceryl moiety, and $R_2$ and $R_3$ contain from 1 to about 3 carbon atoms and from 0 to about 1 hydroxy group, e.g., methyl, ethyl, propyl, hydroxy ethyl, or hydroxy propyl radicals. The arrow in the formula is a conventional representation of a semi-polar bond. Examples of amine oxides suitable for use in this invention include dimethyldodecylamine oxide, oleyldi(2-hydroxyethyl)amine oxide, dimethyloctylamine oxide, dimethyldecylamine oxide, dimethyltetradecylamine oxide, 3,6,9-trioxaheptadecyldiethylamine oxide, di(2-hydroxyethyl)tetradecylamine oxide, 2-dodecoxyethyldimethylamine oxide, 3-dodecoxy-2-hydroxypropyldi(3-hydroxypropyl)amine oxide, dimethylhexadecylamine oxide.

5. Long chain tertiary phosphine oxides corresponding to the following general formula $RR'R''P \rightarrow O$, wherein R contains an alkyl, alkenyl or monohydroxyalkyl radical ranging from 8 to 18 carbon atoms in chain length, from 0 to about 10 ethylene oxide moieties and from 0 to 1 glyceryl moiety and R' and R'' are each alkyl or monohydroxyalkyl groups containing from 1 to 3 carbon atoms. The arrow in the formula is a conventional representation of a semipolar bond. Examples of suitable phosphine oxides are:

dodecyldimethylphosphine oxide,
tetradecyldimethylphosphine oxide,
tetradecylmethylethylphosphine oxide,
3,6,9-trioxaoctadecyldimethylphosphine oxide,
cetyldimethylphosphine oxide,
3-dodecoxy-2-hydroxypropyldi(2-hydroxyethyl)phosphine oxide,
stearyldimethylphosphine oxide,
cetylethylpropylphosphine oxide,
oleyldiethylphosphine oxide,
dodecyldiethylphosphine oxide,
tetradecyldiethylphosphine oxide,
dodecyldipropylphosphine oxide,
dodecyldi(hydroxymethyl)phosphine oxide,
dodecyldi(2-hydroxyethyl)phosphine oxide,
tetradecylmethyl-2-hydroxypropylphosphine oxide,
oleyldimethylphosphine oxide,
2-hydroxydodecyldimethylphosphine oxide.

6. Long chain dialkyl sulfoxides containing one short chain alkyl or hydroxy alkyl radical of 1 to about 3 carbon atoms (usually methyl) and one long hydrophobic chain which contains alkyl, alkenyl, hydroxy alkyl, or keto alkyl radicals containing from about 8 to about 20 carbon atoms, from 0 to about 10 ethylene oxide moieties and from 0 to 1 glyceryl moiety. Examples include:

octadecyl methyl sulfoxide, 2-ketotridecyl methyl sulfoxide,
3,6,9-trioxaoctadecyl 2-hydroxyethyl sulfoxide,
dodecyl methyl sulfoxide,
oleyl 3-hydroxypropyl sulfoxide,
tetradecyl methyl sulfoxide,
3-methoxytridecyl methyl sulfoxide,
3-hydroxytridecyl methyl sulfoxide,
3-hydroxy-4-dodecoxybutyl methyl sulfoxide.

The zwiterionic synthetic detergents useful with the antibacterial agent of the present invention can be broadly described as derivatives of aliphatic quaternary ammonium, phosphonium, and sulfonium compounds, in which the aliphatic radicals can be straight chain or branched, and wherein one of the aliphatic substituents contains from about 8 to 18 carbon atoms and one contains an anionic water solubilizing group, e.g., carboxy, sulfonate, sulfate, phosphate, or phosphonate. A general formula for these compounds is:

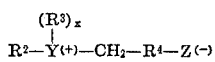

wherein $R^2$ contains an alkyl, alkenyl, or hydroxy alkyl radical of from about 8 to about 18 carbon atoms, from 0 to about 10 ethylene oxide moieties and from 0 to 1 glyceryl moiety; Y is selected from the group consisting of nitrogen, phosphorus, and sulfur atoms; $R^3$ is an alkyl or monohydroxyalkyl group containing 1 to about 3 carbon atoms; $x$ is 1 when Y is a sulfur atom and 2 when Y is a nitrogen or phosphorus atom; $R^4$ is an alkylene or hydroxyalkylene of from 1 to about 4 carbon atoms and Z is a radical selected from the group consisting of carboxylate, sulfonate, sulfate, phosphonate, and phosphate groups.

Examples include:

4-[N,N-di(2-hydroxyethyl)-N-octadecylammonio]-butane-1-carboxylate;
5-[S-3-hydroxypropyl-S-hexadecylsulfonio]-3-hydroxypentane-1-sulfate;
3-[P,P-diethyl-P-3,6,9-trioxatetradecoxylphosphonio]-2-hydroxypropane-1-phosphate;
3-[N,N-dipropyl-N-3-dodecoxy-2-hydroxypropyl-ammonio]-propane-1-phosphonate;
3-(N,N-dimethyl-N-hexadecylammonio)propane-1-sulfonate;
3-(N,N-dimethyl-N-hexadecylammonia)-2-hydroxypropane-1-sulfonate;
4-[N,N-di(2-hydroxyethyl)-N-(2-hydroxydodecyl)ammonio]-butane-1-carboxylate;
3-[S-ethyl-S-(3-dodecoxy-2-hydroxypropyl)sulfonio]-propane-1-phosphate;
3-[P,P-dimethyl-P-dodecylphosphonio]-propane-1-phosphonate; and
5-[N,N-di(3-hydroxypropyl)-N-hexadecylammonio]-2-hydroxypentane-1-sulfate.

The amphoteric synthetic detergents useful in the present invention can be broadly described as derivatives of aliphatic secondary and tertiary amines in which the aliphatic radical can be straight chain or branched and wherein one of the aliphatic substituents contains from about 8 to about 18 carbon atoms and one contains an anionic water solubilizing group, e.g., carboxy, sulfonate, sulfate, phosphate, or phosphonate. Examples of compounds falling within this definition are sodium 3-dodecylaminopropionate, sodium 3-dodecylaminopropane sulfonate, dodecyl-β-alanine, N-alkyltaurines such as the one prepared by reacting dodecylamine with sodium isethionate according to the teaching of U.S. Pat. No. 2,658,072, N-higher alkyl aspartic acids such as those produced according to the teaching of U.S. Pat. No. 2,438,091, and the products sold under the trade name "Miranol" and described in U.S. Pat. No. 2,528,378.

Cationic synthetic detergents include those quaternary ammonium, quaternary phosphonium, and ternary sulfonium compounds containing a single straight chain or branched aliphatic radical containing from about six to about 20 carbon atoms such as dodecyltrimethylammonium chloride; nonylbenzylethyldimethylammonium nitrate; tetradecylpyridinium bromide; octadecylbutylpropylmethylphosphonium nitrite; decyldimethylsulfonium chloride; etc.

Detergent formulations containing the antibacterial compositions of the present invention can also contain from about 0% to about 90%, preferably from about 10% to about 90% of water-soluble alkaline detergency builder salts, either of the organic or inorganic types. Examples of such builder salts can be found in U.S. Pat. No. 3,336,233, issued Aug. 15, 1967, column 9, lines 29–66, which is incorporated herein by reference. However, at a very high pH, the compound may undergo alkaline hydrolysis and accordingly, for long-term stability, the detergent formulations should have a pH of less than about 10 and preferably the pH should be approximately neutral.

The detergent formulations can also contain any of the usual adjuvants, diluents, and additives, for example, perfumes, anti-tarnishing agents, anti-redeposition agents, dyes, fluorescers, suds builders, suds depressors and the like without detracting from the advantageous properties of the antibacterial compositions of the present invention.

Examples of diluents which may be incorporated into a synthetic detergent bar in amounts of up to about 80% of the bar include soaps, especially alkaline earth metal insoluble soaps, (alkaline earth salts of higher fatty acids); starches such as cornstarch; and clays such as china clay or fuller's earth. Other diluents include inorganic salts such as sodium and potassium chlorides and sulfates. Such diluents add bulk to the bar and improve its cosmetic properties without impairing its detergent or cohesive properties.

The antibacterial and antifungal efficacy of the phenylbismuth bis(2-pyridinethiol 1-oxide) is disclosed in the following examples.

EXAMPLE I

Preparation of Phenylbismuth bis(2-pyridinethiol 1-oxide)

164.7 grams of diphenylbismuth acetate (.39 moles) were slurried in 2,600 ml. of dimethylformamide. 59.7 grams of sodium 2-pyridinethiol 1-oxide (.39 mole, 97.3%) were dissolved in 1,300 ml. of dimethylformamide and 18 g. of water were added to this solution. The two solutions were then mixed while stirring at about 32° C. The solution turned yellow. The solution was continuously stirred for 15 minutes, and then put on a steam bath for 15 minutes where a temperature of 52° C. was attained. The solution was then put on a heating mantle for approximately 1 hour at about 52°–58° C. The solution was then filtered, and the filtrate separated with dichloromethane and water (a ratio of approximately 1:1:2). The top layer which contained water and dimethylformamide was discarded. The bottom layer was filtered and washed with water and ether. The resulting impure phenylbismuth bis(2-pyridinethiol 1-oxide) was dried in vacuo.

Approximately 350 g. of this phenylbismuth bis(2-pyridinethiol 1-oxide) was purified as follows: 30 g. of the crude material was dissolved in 2,000 ml. dimethylacetamide at about 60° C. The solution was stirred for approximately 5 minutes, during which time the phenylbismuth bis(2-pyridinethiol 1-oxide) was dissolved, leaving the impurities which were separated by filtering. The filtrate was then diluted with an equal volume of water to precipitate out the phenylbismuth bis(2-pyridinethiol 1-oxide). The mixture was cooled in an ice bath to precipitate as much material as possible, and this material was then separated by filtering. The residue was washed with water and ether and dried in a vacuum to produce essentially pure phenylbismuth bis(2-pyridinethiol 1-oxide). This procedure was repeated until all 350 g. had been processed. The final weight of the material was approximately 332 g. of material having a melting point of about 218° C. The percent of carbon, hydrogen, nitrogen, bismuth, and sulfur present in the phenylbismuth bis(2-pyridinethiol 1-oxide) as calculated and as found by analysis are given hereafter.

Calculated: C, 35.7; H, 2.4; N, 5.2; Bi, 38.8; S, 11.9.
Found: C, 35.5–35.3; H, 2.3–2.2; N, 5.1 (Kjeldahl); Bi, 39.0–39.1; S, 12.0–12.2.

EXAMPLE II

The phenylbismuth bis(2 - pyridinethiol 1-oxide) prepared according to the process of Example I was tested for antibacterial efficacy in the following tests:

I. Minimal Inhibitory Concentration (MIC) in Agar 10,000 p.p.m. stock solutions of phenylbismuth bis(2-pyridinethiol 1-oxide) were prepared in dimethylformamide (DMF). The active was diluted to the desired test concentration and added to 19–20 ml. of molten trypticase soy agar (TSA) to give a series of graded concentrations (p.p.m.). Thorough rotation of plates assured adequate mixing of the sanitizer before agar solidification. Appropriate control plates containing plain TSA were included. All plates remained at room temperature overnight.

Trypticase soy broth cultures for each test organism (24 hour) were diluted in peptone water to give approximately 100 cells per 0.01 ml. The agar plates, marked in sectors, were inoculated by dropping one drop of each diluted culture from a Kline antigen microdropper onto the appropriate sector of agar. The drops were allowed to dry. The plates were incubated 48 hours at 37° C. and then examined for growth. The weakest concentration which completely inhibited growth of an organism was the MIC. The results for the tests were as follows:

Gram-Positive Organisms

| | MIC |
|---|---|
| Staphylococcus aureus (S.a.) | 0.4 |
| Staphylococcus epidermidis (S.ep.) | 0.4 |
| Streptococcus faecalis (St.f.) | 0.8 |
| Streptococcus sp. (St. 126) | 0.1 |
| Sarcina lutea (Sar.l.) | 0.4 |
| Diphtheroid sp. (Dip. 16) | 2 |
| Brevibacterium ammoniagenes | 4 |
| Erysipelothrix insidiosa | 1 |
| Lactobacillus leichmanni | 0.75 |
| Bacillus subtilus | 1 |
| Clostridium perfringens | 1 |
| Corynebacterium acnes | 1 |
| Axilla diphtheroid #16 | 2 |
| Oral Streptococcus #126 | 0.1 |
| Mycobacterium phlei | 5 |
| Mycobacterium smegmatis | 5 |
| Mycobacterium balnei | 5 |

Gram-Negative Organisms

| | MIC |
|---|---|
| Pseudomonas aeruginosa (Ps.a.) | 8 |
| Escherichia coli (E.c.) | 2 |
| Serratia marcescens (S.m.) | 2 |
| Klebsiella pneumoniae (K.p.) | 4 |
| Enterobacter aerogenes (E.a.) | 4 |
| Alkaligenes faecalis | 4 |
| Salmonella typhosa | 4 |
| Shigella flexneri | 4 |
| Mima polymorpha | 8 |
| Herellea vaginicola | 6 |
| Hemophilus gallinarum | 1 |
| Proteus mirabilis | 6 |
| Vibrio metschnikovii | 2 |
| Neisseria flavescens | 2 |

A 7-day old culture of Corynebacterium acnes grown anaerobically on brain heart infusion agar plus 1% glucose (BHIA+1% G) was washed from the slant with 10 ml. of peptone water and drop inoculated on plates containing varying concentrations of phenylbismuth bis(2-pyridinethiol 1-oxide) in BHIA+1% G. The MIC for this organism was 5 p.p.m. A similar test was run using Pityrosporum ovale with TSA plus 0.1% of a 95:5 ratio of oleic:palmitic acid as the culture medium. The MIC was 5 p.p.m.

Fungistatic tests were performed using a modified gradient plate technique reported by Hunt and Sandham (Applied Microbiology 17 #2:329–30, 1969). Results were as follows: Aspergillus niger–5.8 p.p.m.; Microsporum gypseum–1 p.p.m.

II. Human Corneum Disc Diffusion Test

Cornified epidermis was obtained from the plantar surfaces of human volunteers by cutting sheets of uniform thickness (0.4 mm.) with a dermatome. Discs, 6 mm. in diameter, were cut from the sheets with a #2 cork borer. A 1% solution of phenylbismuth bis(2-pyridinethiol 1-oxide) was prepared by dissolving the material in DMF to make a 10,000 p.p.m. stock solution and adding the required amount of this solution to a 2.5% solution of pHisoderm® (a commercially available skin cleansing detergent). Twenty ml. of the 1% solution of phenylbismuth bis(2-pyridinethiol 1-oxide) in pHisoderm® was added to a small screw-cap vial. A control vial was prepared containing 20 ml. of the pHisoderm® solution alone. Six skin discs were added to each of the vials which then were mechanically agitated for 10 minutes in a 50° C. water bath. The vial contents were transferred to a small beaker where the liquid was removed by suction, and the discs were rinsed three times with 30 ml. of distilled water, each rinse followed by suction removal of the rinse water. The discs were then dried for two hours on a paper towel covered with a plexiglass shield to prevent air contamination. The dry discs were placed on the surface of 15 ml. of solidified TSA in a Petri dish (one test disc and one control/dish). A 1:10,000 dilution of each of the six test organisms in TSA at 50° C. was prepared. Each Petri dish was overlaid with 10 ml. of agar seeded with one of the organisms. After agar solidification, the dishes were refrigerated overnight to allow diffusion of any sanitizer away from the disc into the medium. The next day, the dishes were placed in a 37° C. incubator for 24 hours. The diameter of any zone which was clear of bacterial growth was measured in mm. These measurements included the 6 mm. diameter disc. A clear zone is indicative of sanitizer retention on the skin after the washing and rinsing process. The results were as follows:

S.a. ---- 22
E.c. ---- 11
Ps.a. ---- 6.5
S.m. ---- 11.5
K.p. ---- 13
E.a. ---- 9

No zones were produced around discs washed in the pHisoderm® control solution.

III. Filter Disc Diffusion Test

A test which was similar to the skin disc diffusion test was run using filter discs and several types of fabric discs to give an indication of how much sanitizer would remain attached to paper and cloth after rinsing. The results were as follows:

|  | Diameter of disc, mm. | Clear zone | | |
|---|---|---|---|---|
|  |  | S.a. | E.c. | Ps.a. |
| Filter paper | 12.7 | 34 | 25 | 19 |
| Diaper (gauze) | 7.0 | 29 | 15.5 | 8 |
| Terrycloth | 9.0 | 33 | 23 | 18 |
| Untreated muslin | 7.0 | 23.5 | 15.5 | 9 |
| Dishcloth | 8.0 | 25.5 | 17 | 12 |

IV. Handwashing Test

1% phenylbismuth bis(2-pyridinethiol 1-oxide) in pHisoderm® was used by 12 subjects who washed their hands four times. These subjects were chosen at random from a large group of available subjects who use non-sanitizer products exclusively for personal hygiene. The regimented washings in the laboratory followed this procedure: The hands were moistened under 100° F. running tap water. The product was squeezed from a plastic bottle into the palm; the amount approximated the size of a 25-cent piece. The product was then distributed over the hands and the lather was worked for 90 seconds. The hands were then rinsed under running tap water for 30 seconds. The four exposures were spread over two days, and on the afternoon of the second day, the subjects washed their hands four times using a "blank" bar soap containing no antibacterial agents. A fifth standardized washing was then done in a basin containing one liter of sterile distilled water with careful rinsing in this basin. Aliquots were taken from the thoroughly mixed basin contents, added to 30 ml. of sterile distilled water in a membrane funnel, and passed through sterile membrane filters with vacuum suction. The filters were then incubated on pads saturated with 2× concentrated trypticase soy broth plus 10% horse serum and 1% Tween 80 in plastic dishes for 48 hours at 37° C. Colonies appearing on the filters were counted and these numbers multiplied by the appropriate dilution factor to determine the number of bacteria/liter in the fifth basin contents. The numbers per basin for each panelist were converted to logarithms to minimize unusually high or low counts. These values were averaged to determine the mean log of the fifth basin bacterial count. Calculation of the log percent reduction for each subject was made using the log of $1.3 \times 10^6$ or 6.1184, an average fifth basin bacterial count obtained from more than 500 handwashings by non-antibacterial soap users. These values were averaged to obtain the mean log percent reduction. The results were as follows:

Log Percent Reduction                          Mean Log
95.39 ---- 4.7818

A second handwashing test in which the subjects used a measured amount of product (5 ml.) showed the following result:

Log Percent Reduction                          Mean Log
97.48 ---- 4.5103

These tests show that phenylbismuth bis(2-pyridinethiol 1-oxide) in a detergent vehicle is effective against normal skin bacteria *in vivo* under conditions of actual use.

V. Skin Disc Drop Overlay Test

Skin discs of the type used in the skin disc diffusion test were washed in various concentrations of phenylbismuth bis(2-pyridinethiol 1-oxide) in pHisoderm® to determine the minimum parts per million of phenylbismuth bis(2-pyridinethiol 1-oxide) required to inhibit bacteria seeded and placed directly on the disc. The values found were as follows:

S.a. ---- 1
E.c. ---- 2
Ps.a. ---- 10

As can be seen from the above data, phenylbismuth bis(2-pyridinethiol 1-oxide) is an effective antibacterial agent against a wide variety of microorganisms (bacteria, yeasts, and fungi) and is substantive to skin, paper, and cloth.

EXAMPLE III.—SHAMPOO COMPOSITIONS

| Composition | Number | | |
|---|---|---|---|
|  | 1 | 2 | 3 |
| Sulfated coconut fatty alcohol—sodium salt | 23 | 23 | ---- |
| Sodium stearate | 8.7 | 8.7 | ---- |
| Sodium alkyl glyceryl ether sulfonate [1] | ---- | ---- | 28.3 |
| Sodium acyl sarcosinate [2] | ---- | ---- | 5.0 |
| Sodium sulfate | ---- | ---- | 2.6 |
| Sodium chloride | 0.8 | 0.8 | 6.6 |
| Trisodium phosphate | 2.1 | 2.1 | ---- |
| Diethanolamide of coconut fatty acids | ---- | ---- | 2.0 |
| Acetylated lanolin | 1.0 | 1.0 | 1.0 |
| Perfume | 1.0 | 1.0 | 0.4 |
| Phenylbismuth bis(2-pyridinethiol 1-oxide) | 0.5 | 1.0 | 1.5 |
| Water | Balance | | |
| pH | 7.7 | 7.7 | 7.4 |

[1] Alkyl radicals derived from fatty alcohol, 25.3% from coconut and 3% from tallow.
[2] Acyl radicals derived from coconut fatty acids.

Composition #4:                                          Percent
  Dimethyl coconut [1] amine oxide ---- 8.0
  Disodium lauryl beta-iminodipropionate ---- 5.0
  Sodium coconut [1] sulfate ---- 4.0
  Coconut [2] diethanolamide ---- 1.0
  Phenylbismuth bis(2-pyridinethiol 1-oxide) ---- 1.0
  Perfume ---- 0.5
  Color less than ---- 0.01
  Citric acid to adjust pH to 7.5
  Water ---- Balance

[1] The alkyl radical is derived from middle cut coconut alcohol and has approximately the following chain length composition: 2% $C_{10}$, 66% $C_{12}$, 23% $C_{14}$, and 9% $C_{16}$.
[2] Whole cut.

Composition #5

A shampoo composition is obtained by uniformly mixing together the following ingredients:

4% triethanolamine salt of the sulfated condensation product of 3 moles of ethylene oxide and 1 mole of coconut oil fatty alcohol having the following chain length distribution: 2% $C_{10}$, 66% $C_{12}$, 23% $C_{14}$, and 9% $C_{16}$.

10% triethanolamine N-acyl sarcosinate, the acyl radicals being derived from coconut oil fatty acids and having the following chain length distribution: 10% $C_{8-10}$, 48% $C_{12}$, 21% $C_{14}$, 10% $C_{16}$, and 11% $C_{18}$.
3% monoethanolamide of coconut oil fatty acids having the following chain length distribution: 16% $C_{6-10}$, 48% $C_{12}$, 17% $C_{14}$, 9% $C_{16}$, and 10% $C_{18}$.
1% Phenylbismuth bis(2-pyridinethiol 1-oxide).
3% diethanolamide of coconut oil fatty acids having the following chain length distribution: 16% $C_{6-10}$, 48% $C_{12}$, 17% $C_{14}$, 9% $C_{16}$, and 10% $C_{18}$.
7% ethanol.
0.75% methyl cellulose, a 2% solution of which has a viscosity of 4000 cps. at 68° F. and a gel point of 140° F.
0.75% perfume.
Balance, water.

Shampoo formulations containing phenylbusmuth bis-(2-pyridinethiol 1-oxide) are desirable since they will control dandruff.

EXAMPLE IV
Personal Use Detergent Lotion

| Composition #6: | Percent |
|---|---|
| Potassium coconut[1] glyceryl ether sulfonate (about 23% diglyceryl and the balance substantially all monoglyceryl) | 3.0 |
| Sodium coconut[1] glyceryl ether sulfonate (diglyceryl and monoglyceryl content as above) | 4.0 |
| Sodium tallow glyceryl ether sulfonate (diglyceryl and monoglyceryl content as above); the tallow alkyl radicals correspond to those of substantially tallow alcohols containing approximately 2% $C_{14}$, 32% $C_{16}$, and 60% $C_{18}$ | 3.0 |
| Coconut[1] dimethylamine oxide | 5.0 |
| Sodium salt of sulfated condensation product of 1 mole of nonylphenol with 4 moles ethylene oxide | 2.0 |
| Potassium pyrophosphate | 1.0 |
| Phenylbismuth bis(2-pyridinethiol 1-oxide) | 2.0 |
| Sodium chloride (in addition to that from detergents) | 3.0 |
| Sodium toluene sulfonate | 2.5 |
| Sodium carboxymethylcellulose (degree of substitution 0.65–0.95; viscosity of 1% soln., 1000–2000 cps. at 25° C.) | 0.3 |
| Acrylamide polymer (contains 5–10 mole percent acrylic acid radicals; monomer is less than 0.05%; viscosity of a 0.5% soln. is about 10–15 cps. at 25° C.) | 0.1 |
| Salts (sodium and potassium chloride and sulfate from detergents) | 1–2 |
| Water | Balance |

[1] Coconut indicates alkyl radicals corresponding to those of middle cut coconut fatty alcohol containing approximately 2% $C_{10}$, 66% $C_{12}$, 23% $C_{14}$, and 9% $C_{16}$.

EXAMPLE V
Cream Shampoo

| Composition: | Percent |
|---|---|
| Sodium coconut glyceryl ether sulfonate (about 29% diglyceryl and the balance substantially monoglyceryl) | 14.8 |
| Sodium tallow glyceryl ether sulfonate (about 28% diglyceryl and the balance substantially monoglyceryl) | 2.0 |
| Sodium chloride | 6.7 |
| Sodium sulfate | 3.5 |
| Sodium N-lauroyl sarcosinate | 3.0 |
| Phenylbismuth bis(2-pyridinethiol 1-oxide) | 2.0 |
| Middle-cut coconut[1] diethanolamine | 0.5 |
| Acetylated lanolin | 1.0 |
| Perfume | 0.4 |
| Water | Balance |

[1] 2% $C_{10}$, 66% $C_{12}$, 23% $C_{14}$, and 9% $C_{16}$.

EXAMPLE VI

A milled toilet detergent bar is prepared in accordance with methods known and used in the art and having the following composition:

| Composition: | Percent |
|---|---|
| Sodium alkyl glycerol ether sulfonate (alkyl group derived from the middle-cut[1] of alcohols obtained by catalytic reduction of coconut oil) | 8.0 |
| Potassium alkyl sulfate (alkyl group derived from the middle cut[1] of alcohols obtained by catalytic reduction of coconut oil) | 20.0 |
| Magnesium soap of 80:20 tallow:coconut fatty acids | 17.0 |
| Inorganic salts (sodium and potassium chlorides and sulfates) | 32.0 |
| Phenylbismuth bis(2-pyridinethiol 1-oxide) | 1.0 |
| Water and minors | Balance to 100 |

[1] Middle-cut alcohols having a chain length distribution substantially as follows: 2% $C_{10}$, 66% $C_{12}$, 23% $C_{14}$, and 9% $C_{16}$.

This bar cleans well and exhibits good odor reducing properties evidencing antibacterial effectivenes. It reduces the number of bacteria on the skin significantly.

EXAMPLE VII

A granular built synthetic detergent composition having the following formulation can be prepared and the antibacterial compositions of the present invention can be incorporated therein.

| Composition: | Percent |
|---|---|
| Sodium dodecylbenzene sulfonate | 17.5 |
| Sodium tripolyphosphate | 50.0 |
| Sodium sulfate | 14.0 |
| Sodium silicate ($SiO_2$:$Na_2O$=2:1) | 7.0 |
| Phenylbismuth bis(2-pyridinethiol 1-oxide) | 3.0 |
| Water and minors | Balance to 100 |

This composition, in addition to performing well in its cleaning capacity, imparts considerable antibacterial activity to fabrics cleansed in its solution.

Substantially equivalent results are obtained, i.e., good cleaning and good odor reducing properties, when the sodium dodecylbenzene sulfonate of Example VII is replaced, on an equal weight basis, by the following:

dodecyltrimethylammonium chloride;
nonylbenzylethyldimethylammonium nitrate;
tetradecylpyridinium bromide;
octadecylbutylpropylmethylphosphonium nitrite;
decyldimethylsulfonium chloride;
(hexylphenyl)dimethylbenzylammonium fluoride;
eicosyldimethylphosphonium chloride;
coconutalkylmethylmorpholinium nitrate;
octadecylmethylbenzylsulfonium sulfate;
laurylpyridinium chloride;
laurylpyridinium bromide;
laurylpyridinium bisulfate;
laurylpyridinium-5-chloro-2-mercaptobenzothiazole;
laurylpicolinium-p-toluenesulfonate;
tetradeclylpyridinium bromide;
cetylpyridinium chloride;
cetylpyridinium bromide;
laurylisoquinolinium bromide;
laurylisoquinolinium saccharinate;
alkylisoquinolinium bromide;
N-cetyl-N-ethyl-morpholinium ethosulfate;
benzalkonium chloride;
monoquaternaries $R_4N^+X^-$ (one R group is fatty);
octadecyltrimethylammonium chloride;
coconut alkyl trimethylammonium chloride;
dodecylbenzyltri(octyldecyl)ammonium chloride;
monoquaternaries $R_4N^+X^-$ (two R groups are fatty);
dihexadecyldimethylammonium chloride;
di-coconut alkyl dimethylammonium chloride;

monoquaternaries $R_4N^+X^-$ (three R groups are fatty);
tri(hydrogenated tallow) methylammonium chloride;
distilled tallow amine acetate;
diamine acetates;
N-oleyl propylene diamine monoacetate;
sodium tallow alkyl sulfate;
potassium coconut alkyl glyceryl ether sulfonate;
sodium salt of randomly sulfonated paraffin containing an average of 15.2 carbon atoms;
ammonium tridecyl sulfate;
condensation product of octyl phenol with 15 moles of ethylene oxide per mole of octyl phenol;
dimethyldodecylamine oxide;
dodecyldimethylphosphine oxide;
tetradecyl methyl sulfoxide;
3-(N,N-dimethyl-N-hexadecylammonio)propane-1-sulfonate;
3-dodecylaminopropionate; and
dodecyl-$\beta$-alanine.

The invention has been described above in conjunction with toilet and laundry detergents. It will be obvious to those skilled in the art, however, that the antibacterial compositions of the present invention can also be beneficially employed in such products as shampoos, foot powders, antiseptic ointments, cosmetic products and the like.

A fabric softening composition having the following formulation can be prepared. The antibacterial and antifungal effectiveness of the phenylbismuth bis(2-pyridinethiol 1-oxide) is especially desirable since the antibacterial and antifungal compound is extremely substantive to cloth.

Composition: Percent
Dialkyl dimethylammonium chloride 75% active ingredient dispersed in isopropanol and water, the dialkyl groups being approximately 24% hexadecyl, 75% octadecyl and 1% octadecenyl _____ 7
The condensation product of 30 moles of ethylene oxide with one mole of coconut alcohol __ 3
Color and perfume _____ 0.3
Phenylbismuth bis(2-pyridinethiol 1-oxide) ____ 1.0
Water _____ Balance Twenty p.p.m. of PBDP were added to a 0.1% aqueous concentration of Downy®, a commercial cationic softener containing a ditallowalkyl dimethylammonium chloride active. This composition, when used at 27° C. for ten minutes to treat Dacron-prebrightened, Nylon, muslin, Nylon-prebrightened, muslin-prebrightened, and Dacron:cotton (65:35)-prebrightened cloth which had been washed with Ivory Snow®, a commercial soap powder, and machine dried, completely controlled the growth of *S. Aureus, S. faecalis, E. coli, C. albicans,* and *P. mirabilis.* With similar compositions containing 5 p.p.m. PBDP, one rinse gave complete protection against *S. aureus* and *S. faecalis,* after three rinses *E. coli* and *C. albicans* are stopped, and after four rinses, *P. mirabilis* is inhibited. With similar compositions containing 30–40 p.p.m. PBDP, one rinse gave protection against *P. aeruginosa* on muslin, nylon, and the Dacron:cotton blend.

What is claimed is:
1. The process of controlling a broad spectrum of bacteria, yeast, and fungal species, comprising contacting said bacteria, yeast, or fungal species with an effective amount of phenylbismuth bis(2-pyridinethiol 1-oxide).
2. The process of Claim 1 in which dandruff is controlled, wherein the contacting is by shampooing the head with a shampoo composition comprising:
   (A) a water-soluble detergent selected from the group consisting of soaps and non-soap synthetic detergents;
   (B) from about 0.2% to about 3% of the compound of phenylbismuth bis(2-pyridinethiol 1-oxide); and
   (C) balance, water;
said shampoo composition having a pH of less than about 10.
3. The process of Claim 1 wherein the species is the bacterium Pseudomonas aeruginosa.

References Cited

Ottmann et al.—Chem. Abst. vol. 68, p. 87164g, 1968.

SAM ROSEN, Primary Examiner